United States Patent
Hanamoto et al.

(10) Patent No.: US 6,356,520 B1
(45) Date of Patent: Mar. 12, 2002

(54) DISK STORAGE DEVICE

(75) Inventors: Yasushi Hanamoto, Hanyu; Toshihiko Hiroshima, Ota, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/714,021

(22) Filed: Nov. 16, 2000

(30) Foreign Application Priority Data

Nov. 24, 1999 (JP) .......................................... 11-333105

(51) Int. Cl.$^7$ ................................................. G11B 7/00

(52) U.S. Cl. ................. 369/47.1; 369/47.28; 369/53.11; 369/59.1

(58) Field of Search .............................. 369/47.1, 47.11, 369/47.12, 47.13, 47.15, 47.28, 47.33, 53.1, 53.11, 53.21, 53.44, 59.1, 59.14

(56) References Cited

U.S. PATENT DOCUMENTS 5,497,243 A * 3/1996 Sakata et al. ............. 369/32 X
5,550,799 A * 8/1996 Inoue et al. ................. 369/116
5,587,978 A * 12/1996 Endo et al. ................... 369/32

* cited by examiner

Primary Examiner—Muhammad Edun
(74) Attorney, Agent, or Firm—Hogan & Hartson, L.L.P.

(57) ABSTRACT

Additional recording data is written continuously with data already recorded on a disk and writing of additional data is started in synch with recorded data. The optical head 1 reads data recorded on the disk just before recording is halted every time the record decision unit 22 judges that recording is to be halted. The record-status detection unit 25 detects the formation status of the recorded data. The head output control unit 14 sets the luminous output of the optical head 1 at the beginning of additional writing according to the recording state judged by the record-state detection unit 25. Thus, the formation status of data recorded on a disk is detected to allow the luminous output of the optical head 1 to be set to an optimum record level.

3 Claims, 1 Drawing Sheet

DISK STORAGE DEVICE

BACKGROUND OF THE INVENTION

1. Field of the Invention

The present invention relates to a disk storage device for storing recording data on a disk using an optical beam emitted from an optical head. Particularly, the present invention relates to a disk storage device that can correct and record the luminous output of an optical head according to variations in recording sensitivity of a disk.

2. Description of Related Art

CD-R (Compact Disk-Recordable) drives or CD-RW (Compact Disk-ReWritable) drives of the CD (Compact Disk) family are well known disk storage systems for recording digital data onto a disk using an optical beam emitted from an optical head.

Disks onto which data is recorded by the recording devices associated with such disk storage systems have different recording sensitivities due to different material qualities used by manufacturers, or due to variations between materials use or quality within a single disk.

In disk storage devices, the luminous output of an optical head at the recording time is set to an optimum recording level for recording data onto a disk.

For that reason, in the disk storage devices, the luminous output of an optical head at the time of recording is set to an optical recording level to compensate for recording sensitivity differences of a disk.

The optimum recording level of a luminous output emitted from an optical head at the time of recording is set by stepwise varying the luminous output to execute trial writing in an calibration area for luminous output setting. The calibration area is disposed differently from the program area for actually recording data onto a disk.

While data is being recorded onto a disk during trial writing using the luminous output preset as an optimum record level, the reflection level of a record pulse is detected. The luminous output is then corrected according to the reflection level to adjust the luminous output to an actual data recording state to a practical record level.

However, since the formation status of data recorded onto a disk is not actually detected, the luminous output of an optical head is not set to an actual optimum recording level. Although the disk storage device is designed to speed up the recording rate, associated with the speeding up of the recording rate of the disk storage device is s narrowing of the pulse width of a record pulse. Hence, it is difficult to detect the reflective level of a recording pulse. It is not now possible to correct and adjust the luminous level to an optimum recording level in an actual data recording state during disk recording.

SUMMARY OF THE INVENTION

This invention is made to overcome the above-described problem. It is an object of the present invention to provide a disk storage device that can correct and record the luminous output of an optical head according to variations in recording sensitivity of a disk.

According to the present invention, the record-start-position detection unit detects a record-start-position where writing of additional data to be recorded onto the disk begins. Meanwhile, the synchronous setting unit creates recording data to be additionally synchronously written with the recorded data. New recording data is additionally written continuously to data recorded on a disk. The additional writing is started in synchronous with recorded data. The optical head reads data recorded onto a disk immediately before a halt of recording every time the record decision unit judges a halt of recording. The record-state detection unit detects the formation status of the recorded data. The head output control unit sets the luminous output of the optical head at the beginning of additional writing according to the recording state judged by the record-state detection unit. Thus, an optimum recording level is set by actually detecting the formation of data recorded on a disk every additional writing operation and by stepwise correcting the luminous output of the optical head.

BRIEF DESCRIPTION OF THE DRAWINGS

These and other objects, features, and advantages of the present invention will become more apparent upon a reading of the following detailed description and drawing, in which.

DESCRIPTION OF THE PREFERRED EMBODIMENT

Figure 1:
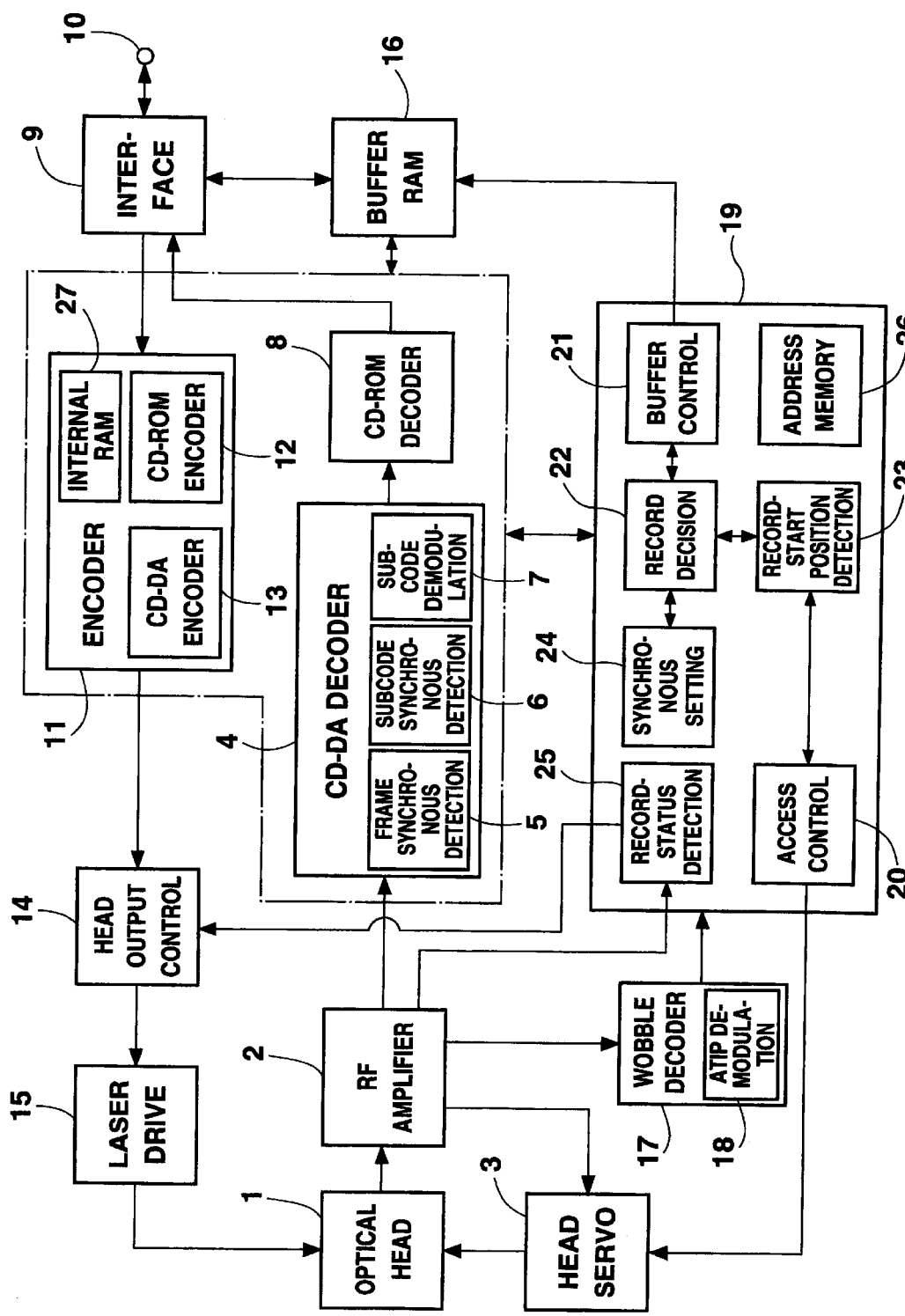
FIG. 1 is a circuit block diagram illustrating a CD-R drive embodying an optical disk recording method, according to an embodiment of the present invention.

FIG. 1 is a circuit block diagram illustrating a CD-R drive being a disk recording device according to a preferred embodiment of the present invention.

Referring to FIG. 1, an optical head 1 emits a laser which traces signal tracks of a disk to write recording data onto the disk and to read recording data from the disk.

An RF amplifier 2 amplifies a RF signal (radio frequency signal) contained in an optical output received by the optical head 1 and converts it into two valued signals. A head servo circuit 3 feeds back various optical outputs obtained by the optical head 1. The head servo circuit 3 performs a focusing control for focusing the laser onto the signal surface of a disk and performs a tracking control for tracking the laser along the signal tracks of the disk. The head servo circuit 3 also performs a thread feeding control for feeding the optical head 1 in the direction of the diameter of the disk.

A CD-DA decoder 4 decodes two valued data of an RF signal output from the RF amplifier 2 over a range specified in the signal format of an audio-only CD-DA disk synchronous with bit clock pulses. The CD-DA decoder 4 separates various data from the two valued data of a RF signal and then EFM decodes EFM (Eight to Fourteen Modulation) data. A frame synchronous detection unit 5 detects a frame synchronous signal representing the leading of a (EFM) frame of the EFM data. A subcode synchronous detection unit 6 detects a synchronous signal (S0, S1) in a subcode configured of 98 EFM frames. A subcode decoder 7 decodes the subcode.

A CD-ROM decoder 8 decodes data decoded by the CD-DA decoder 4 over the range specified in the signal format of a CD-ROM disk. The CD-ROM decoder 8 synchronously detects CD-ROM data specified in the signal format of the CD-ROM disk and executes error detection and error correction according to an EDC (Error Detection Code) and an ECC (Error Correction Code) for the CD-ROM disk.

An interface 9 controllably exchanges data with host equipment, e.g. personal computers, externally connected via the connection terminal 10. An encoder 11 modulates data input to the interface 9 into data to be recorded onto a disk. The encoder 11 includes a CD-ROM encoder 12 and a CD-DA encoder 13. The CD-ROM encoder 12 adds an error detection code EDC and an error correction code ECC for sync, header and CD-ROM data to input data based on the CD-ROM standards. The CD-DA encoder 13 processes a process regarding an error correction code CIRC (Cross Interleaved Reed-Solomon Code) in a CD-DA system to CD-ROM data standards encoded by the CD-ROM encoder 12, based on the CD-DA standards. Thus, the CD-DA encoder 13 adds the processed code to a subcode and then subjects the resultant data to an EFM process and then adds the processed data to a frame synchronous signal.

A head output control circuit 14 generates the control output to control the laser emitted from the optical head 1, based on recorded data regarding EFM data output from the encoder 11. A laser drive circuit 15 drives the laser source of the optical head 1 to record data onto a disk according to the control output from the head output control circuit 14. The laser drive circuit 15 sets the luminous output of the laser source in the optical head 1 to a recording level suitable for recording data onto a disk in a recording mode. The laser drive circuit 15 records a "1" level signal configuring recorded data, onto the disk, with the laser source of the optical head 1 being emitted with the laser drive circuit 15. Moreover, the laser drive circuit 15 records a "0" level signal configuring recorded data onto the disk, with the light emission of the laser source of the optical head 1 being interrupted.

A buffer RAM 16 is used to cache data input through the interface 9 and to modulate data to be recorded onto the disk by means of the encoder 11. The buffer RAM 16 also is used to cache data read out of the disk and to demodulate the data by means of the CD-ROM decoder 8.

A wobble decoder 17 demodulates a subtraction signal output from the RF amplifier 2 to extract a wobble component of 22.05 kHz from a pre-groove signal of a disk, thus creating a component necessary for rotational control of the disk. The wobble decoder 17 has an ATIP demodulation circuit 18 that demodulates ATIP (Absolute Time In Pregroove) from wobble components.

A system control circuit 19 performs system control related to the recording and reproduction of a disk. The system control circuit 19 includes an access controller 20, a buffer controller 21, a record decision unit 22, a record-start-position detection unit 23, a synchronous setting unit 24, and a record-status detection unit 25. The access controller 20 controls an access operation by selectively referring to a subcode address of absolute time information in a subcode (sub Q code) demodulated with the subcode demodulation circuit 7 and an ATIP address of absolute time information in ATIP demodulated with the ATIP demodulation circuit 18. The buffer controller 21 controls the data writing to and the data reading out of the buffer RAM 16. According to either the data storage capacity of the buffer RAM 16 by the buffer control unit 21 or a command from host equipment connected to the connection terminal 10, the record decision unit 22 determines a halt or start of data recording onto the disk. The record-start-position detection unit 23 detects, as a record-start position of a disk, the position at which the end of data recorded onto a disk in an intermission mode due to an interruption continues when the record decision unit 22 determines starting a recording operation. The synchronous setting unit 24 synchronizes data to be newly recorded onto a disk with data already recorded onto that disk, using a subcode synchronous signal detected by the subcode synchronous detection circuit 6 and sub-Q data demodulated by the subcode demodulation circuit 7. After the optical head 1 reads data recorded on the disk just before recording is halted, which is done every time the record decision unit 22 judges that recording is to be halted, the record-status detection unit 25 detects the formation status of the recorded data.

The record-condition detection unit 25 detects the formation condition of the recorded data based on the reflected light level detected from the light receiving output of the optical head 1 when the optical head 1 reads data recorded on a disk immediately before a halt of recording.

Then, the record-condition detection unit 25 controls the head output control circuit 14 according to the recording state detected and judged, thereby setting the luminous output of the optical head 1 at the additional-writing start time.

In more detail, the record-condition detection unit 25 presets as a reference voltage a reflected-light-amount voltage corresponding to a reflected light amount received by the optical head 1 such that the error ratio of reproduced data, obtained by reading recorded data recorded with standard equipment and a standard disk, is minimized. The record-condition detection unit 25 also detects with respect to the reference voltage a variation which varies the reflected light amount corresponding to the reflected light amount received by the optical head 1 when recorded data is actually traced in a reproduction state. The variation is detected as a recorded-data forming condition. The record-condition detection unit 25 controls the head output control circuit 14 according to the variation and adjusts the luminous output of the optical head 1 at the recording time to an optimum recording level based on actually-recorded data to thereby record data with a minimum error ratio upon reproduction.

Next, the recording operation of the disk storage device with the above configuration will be explained.

When recording data transmitted by host equipment connected to the connection terminal 10 is received by the interface 9, the interface 9 writes the data to the buffer RAM 16.

When the amount of data written into the buffer RAM through the interface 10 reaches an amount at which the encoder 11 is set to start then encoding operation, the encoder 11 reads data out of the buffer RAM 16. Thus, the encoder 11 modulates recording data (EFM data) to be recorded onto a disk in EFM frame units.

When the tracking position of the optical head 1 comes to a recording start position of a disk, the encoder 11 sequentially outputs the recording data in EFM frame units. The address data of an ATIP address demodulated in the ATIP demodulation circuit 18, corresponding to the output recording data, is stored and updated sequentially into the address memory 26 disposed within the system control circuit 19.

The laser drive circuit 15 drives the laser source of the optical head 1 based on the recording data output from the encoder 11 to record data onto a disk.

Data is recorded in record units, e.g. in file units. When there is a break in recording, the record decision unit 22 decides a suspension of recording data onto a disk.

When the record decision unit 22 determines to halt recording data onto the disk, the encoder 11 suspends its output operation while the head output control circuit 14 stops outputting a control output which controls the laser drive circuit 15. Thus, the optical head 1 halts emission of the laser set for recording and recording of data onto a disk is stopped. In this case, the encoder 11 does not create the joint block (run-out) which connects recorded data sets so that recording is stopped without recording the joint blocks.

Next, when the interface 9 receives data required for recording and the data capacity stored in the buffer RAM 16 reaches the data amount at which the encoder 11 starts encoding, the record decision unit 22 judges to resume recording onto the disk.

When the record decision unit 22 judges the beginning of recording, the encoder 11 starts encoding data required for new recording.

Provided that the encoder 11 resumes encoding with the data immediately following the final data encoded before recording was halted, the interleave length of CIRC (108 frames at maximum in the EFM frame) is reserved to data encoded immediately before the beginning of recording based on data stored in the internal RAM within the encoder 11. Hence, if necessary, the encoding process may be initiated using data stored in the internal RAM 27 immediately before recording was halted.

When the record decision unit 22 determines to resume recording data onto the disk, the head output control circuit 14 sets the luminous output of the optical head 1 to a reproduction level. Thus, data recorded onto the disk is accessed to an area around the final end of the recorded data, by referring to an ATIP address stored in the address memory 26.

When the record decision unit 22 determines to resume recording, the record-start-position detection unit 23 detects the final end of data recorded on the disk immediately before recording was halted. Thus, the front end of an unrecorded area continuous with the final end of the detected data is set as a record starting position.

In the record-starting-position detection, the record-start-position detection unit 23 accesses near the final end of recording data according to judge on the start of recording of the record decision unit 22. The optical head 1 first refers to a subcode address stored in the address memory 26 in a trace state of a reproduction mode. Thus, the accessing is executed up till the EFM frame one address back from the subcode address. Thereafter, the record-start-position detection unit 23 detects a frame synchronous signal to count EFM frames and then detects the final EFM frame in a subcode frame corresponding to the subcode address. When the frame synchronous signal of the final EFM frame is detected, the record-start-position detection unit 23 counts bit clock pulses, thus detecting the final end position of data recorded onto a disk.

When accessing is made in a trace state of a reproduction mode while the record start position of a disk is detected, the CD-DA decoder 4 performs the decoding operation synchronous with clock pulses reproduced from the EFM data. Meanwhile, the synchronous setting unit 24 enables the encoder 11 to perform an encoding operation synchronous with the reproduced clock pulses. Thus, the recording data created by the encoder 11 is synchronized with data recorded onto a disk.

When the record start position of a disk is detected, the operational clock for the encoder 11 is switched from the reproduction clock to the recording clock. The recording clock corresponds to a reference clock with crystal oscillation precision created by the PLL (Phase Locked Loop) or a system clock synchronized with the bit clock having a wobble component.

When the operational clock of the encoder 11 is switched to the recording clock, the encoder 11 performs an encoding operation in sync with the recording clock. Meanwhile, the head output control circuit 14 generates control outputs based on the recording data additionally written following data recorded onto a disk in a stand-by state by means of the encoder 11. Therefore, writing recording data from the leading of an unrecorded area of a disk is started in synchronous with recorded data. In such case, the encoder 11 does not create joint blocks (LINK and run-in) connecting recording data sets. Hence, recording data onto a disk is started without recording the joint blocks and therefore data can be additionally written onto a disk although a joint block is not recorded on a joint portion of the leading of recording data to be additionally written.

Moreover, data can be additionally written without disposing a joint block on the end of recording data at a recording stop time. Therefore, the recording capacity of a disk can be effectively utilized.

When the synchronous setting unit 24 reads recorded data to synchronize additional data to be written with the data already recorded on the disk, the record status detection unit 25 detects the formation status of recorded data.

The head output control circuit 14 therefore controls the laser drive circuit 15 according to the formation status of recorded data detected by the record-status detection unit 25. Thus, the luminous output of the optical head 1 in an additional-writing start time is corrected according to the formation status of data recorded onto the disk immediately before recording was halted.

Therefore, the luminous output of the optical head 1 at an additional writing time is corrected to an optimum recording level to record data with a minimum error ratio.

Additional recording data can be accurately synchronized with data recorded on the disk before halting of recording. Moreover, continuity can be maintained before and after the joining of data sets separately written onto a disk. Hence, the record decision unit 22 can independently decide when to halt data recording.

As described above, when recording data onto a disk, the present system can set the luminous output of the optical head to an optical recording level set according to the formation status of data already recorded onto the disk. Hence, data can be recorded with high quality, independent of differences between respective disks. Moreover, high recording quality can be maintained over the entire area of the disk.

Moreover, the formation status of data already recorded onto a disk can be detected effectively even while recorded data is being read to synchronize further data recording.

What is claimed is:

1. A disk storage device, wherein data is recorded onto a disk using an optical beam emitted from an optical head, comprising:

a record decision unit for determining when to stop and start recording of data onto the disk;

a record-start-position detection unit for detecting a record-start position from which additionally writing recording data on the disk starts when said record decision unit judges a start of recording of recording data;

a synchronous setting unit for reading data recorded onto a disk before a halt of recording when said record decision unit judges a start of recording of recording data, and for synchronizing recording of additional data to be written with the already recorded data;

a record-status detection unit for reading data recorded on the disk before a halt of recording every time said record decision unit judges a halt of recording and then detecting the formation status of recorded data; and a head output controller for setting the luminous output of said optical head at the time of starting according to the recording state detected by said record-status detection unit.

2. The disk storage device defined in claim 1, wherein said record-status detection unit detects the formation status of recording data according to the level of a reflected light, the level of said reflected light being detected based on the luminous output of said optical head when said optical head reads data recorded onto the disk immediately before a halt of recording.

3. The disk storage device defined in claim 1, wherein said record-status detection unit detects the formation status of data recorded on a disk immediately before a halt of recording, at the time of reading recorded data at which said synchronous setting unit synchronizes data to be additionally written with recording data.

* * * * *